US006223560B1

(12) United States Patent
Girotti et al.

(10) Patent No.: US 6,223,560 B1
(45) Date of Patent: May 1, 2001

(54) PROCESS OF PRODUCING A GLASSY PRODUCT FOR MULTIPLE APPLICATIONS AND PRODUCTS OBTAINED BY THE PROCESS

(75) Inventors: Roberto Girotti; Luis Domingo Tatasciore, both of Buenos Aires (AR)

(73) Assignee: Cerocon S.A., Buenos Aires (AR)

( * ) Notice: Subject to any disclaimer, the term of this patent is extended or adjusted under 35 U.S.C. 154(b) by 0 days.

(21) Appl. No.: 09/438,638

(22) Filed: Nov. 12, 1999

Related U.S. Application Data

(63) Continuation-in-part of application No. 09/045,343, filed on Mar. 20, 1998, now abandoned.

(51) Int. Cl.$^7$ ................................................. C03C 14/00
(52) U.S. Cl. .............................. 65/19; 65/21.2; 65/134.3; 65/134.8; 588/11; 588/19; 588/256; 588/257; 588/901
(58) Field of Search .............................. 65/19, 21.1, 21.2, 65/134.3, 134.8, 135.9; 588/11, 18, 19, 252, 256, 257, 901

(56) References Cited

U.S. PATENT DOCUMENTS

| 3,607,190 | * | 9/1971 | Penberthy | 65/134.8 |
|---|---|---|---|---|
| 3,906,140 | * | 9/1975 | Capes | 428/403 |
| 4,172,017 | * | 10/1979 | Abraham | 205/367 |
| 4,256,719 | * | 3/1981 | Andel | 423/424 |
| 4,341,566 | * | 7/1982 | Barrett et al. | 106/313 |
| 4,632,690 | * | 12/1986 | Colwell, Jr. et al. | 588/201 |
| 4,752,314 | * | 6/1988 | Fassbender et al. | 65/136.1 |
| 4,988,376 | * | 1/1991 | Mason et al. | 65/134.3 |
| 5,280,492 | * | 1/1994 | Krupke et al. | 372/41 |
| 5,538,526 | * | 7/1996 | Edwards | 65/21.2 |
| 5,637,127 | * | 6/1997 | McLaughlin et al. | 65/134.8 |
| 5,718,737 | * | 2/1998 | Mosch | 65/30.1 |
| 5,770,445 | * | 6/1998 | Kindsvogel et al. | 435/334 |
| 5,776,725 | * | 7/1998 | Kindsvogel et al. | 435/69.1 |
| 5,830,251 | * | 11/1998 | Simpson et al. | 65/17.3 |
| 5,838,489 | * | 11/1998 | Erdmann | 359/357 |
| 5,919,635 | * | 7/1999 | Kindsvogel et al. | 435/7.2 |

OTHER PUBLICATIONS

Hackh's Chemical Dictionary, fourth edition, pp 123–125, 1969.*
Merriam–Wester's Collegiate Dictionary, tenth edition, p. 449, 1999.*
The Random House Dictionary of the English Language, p. 547, 1967.*

* cited by examiner

*Primary Examiner*—Sean Vincent
(74) *Attorney, Agent, or Firm*—Robin Blecker & Daley

(57) ABSTRACT

A process for recycling trash and obtaining a glassy vitreous product by mixing trash with a vitrifying composition comprising 30% Sodium Sulphate, 7% Quartz, 20% Calcium Carbonate, 23% Sodium Carbonate, 13% Organic Sulphate (consisting of 20% Sodium Sulphate and 80% Carbon Hydrates) and 7% Calcium Fluor, the composition comprising the 10–20 weight percentage of the mixture and thermochemically transforming the mixture, the product being used in multiple applications. The glassy product obtained by the process is also provided by the invention.

18 Claims, No Drawings

PROCESS OF PRODUCING A GLASSY PRODUCT FOR MULTIPLE APPLICATIONS AND PRODUCTS OBTAINED BY THE PROCESS

CROSS-REFERENCE TO RELATED APPLICATIONS

This application is a continuation-in-part of application Ser. No. 09/045,343, filed Mar. 20, 1998 now abandoned.

BACKGROUND OF THE INVENTION

1. Field of the Invention

The present invention relates to the field of recycling garbage and particularly refers to the disposal and recycling of all kind of trash for obtaining a useful material and products, the trash including home garbage, industrial effluents, pathological trash, even dangerous highly contaminating residues. The invention relates to methods for neutralizing the contaminating activity of the residues and transforming the trash into inert and useful products, the trash also including industry slurries, wasted hydrocarbons, wasted products from fuel service stations, paints, food, batteries, oils, pathological residues from hospitals, contaminating products in general, the useful products obtained from the inventive method comprises a chemically stable, glassy, vitreous, non contaminating material, capable of being used in multiple applications.

To the purpose of the present specification the term trash must be understood as including all kind of garbage from homes, industries, hospitals, and all other trash that may be incinerated into ashes.

2. Description of the Prior Art

The disposal of the trash is a world wide concern, particularly in those most crowded urban centers, specially the handling and disposal of the dangerous and contaminating trash resulting from the practicing of modern industrial technologies, from hospitals using more and more disposable elements and even from homes. Many solutions have been tried to dispose the trash without future consequences to the environment.

One of the most widely used process to dispose trash, particularly non dangerous, non contaminating garbage, is the incineration of the trash to obtain ashes. The ashes are then disposed in containers, some of them hermetic containers, and the containers are buried. Those ashes that are analyzed by Governmental Authorities and contamination levels are detected are not allowed to be buried and the disposal of the containers results in a problem to the Governments.

As to the highly contaminating residues, such as batteries and, dangerous chemical effluents, many countries are studying a way to dispose the same without risk to the community, but not final and convincing solutions have been found. One attempt to dispose of this dangerous trash was to compact the trash and encapsulate the same into a glass cover that, when solidified, entirely encloses the trash isolating the same from the outer environment. Those glass capsules are then buried. The decomposition of the garbage, however, generates gases that produces splits, cracks and fissures in the glass cell with the contaminating gasses and mass of the trash leaking out of the glass container to the soil, contaminating the phreatic layers.

Other similar techniques consist of compacting the trash and encapsulating the same in metal or concrete containers with caps, which containers are closed with the caps, sealed and disposed at the sea. With a similar behavior as described in relation to the glass buried containers, the trash, under a chemical non stable conditions, causes the container to be broken under the inner gas pressure, with the contaminating residues leaking out of the container to the environment.

It would be therefore necessary to count on a process that may guarantee a chemically-stable, safety disposal of trash, whereby the trash may be disposed without contamination activity in the trash per se, that is, with the trash entirely neutralized as to its original contaminating activity, whereby the trash, in an inert state, may be used as a recycling product.

U.S. Pat. No. 5,718,737 to Duane A. Mosch discloses a method of recycling mixed colored cullet into amber, green, or flint glass by using gypsum. It is well known that while the calcium sulphate is a good flux, the gypsum obtained after calcination of the calcium sulphate products bubbles and granules in the melting process of the glass.

U.S. Pat. No. 5,830,251 to Simpson et al. relates to the manufacturing of ceramic tiles from industrial waste. The process includes melting a material to form a glass melt, treating the glass melt to produce a solid glass product, grinding the solid glass product to produce glass particles having a particle size of less than 200 microns, mixing the glass particles with a first additive to form a glass powder mixture having a composition of 55 to 99 wt. % glass particles and 45–1 wt. % first additive, forming the glass powder mixture into tiles by dry pressing, where the tiles have a primary crystalline phase selected from the group consisting of nepheline, diopside, anorthite, wollastonite, melilite, merwinite, opinel, akermanite, gehlenite, crystalline phases based on iron substitution in the crystalline phase, and mixture thereof. The process includes a devitrifying step where the solid glass product is devitrified prior to the grinding step of the glass particles in the tile are devitrified after the forming step. Because of the constituents used in the process of Simpson, a cyclone furnace must be used.

3. Summary of the Invention

It is therefore an object of the present invention to provide a method for recycling trash, even dangerous and contaminating trash, by entirely neutralizing the contaminating activity of the trash.

It is still another object of the present invention to provide a method for manufacturing a stable material by recycling trash, the material being capable of being molded or converted into powder to be used in multiple applications such as in building construction, in manufacturing of tiles, lining, ballast, paving, fillers, etc.

It is further object of the present invention to provide a method for recycling trash and industrial slurry effluents by: mixing the trash and the industrial slurry effluents; adding a composition containing 30% Sodium Sulphate, 7% Quartz, 20% Calcium Carbonate, 23% Sodium Carbonate, 13% Organic Sulphate (consisting of 20% Sodium Sulphate and 80% Carbon Hydrates) and 7% Calcium Fluor to form a mixture mass, the composition comprising the 10–20 weight % of the mixture; mixing the trash, the industrial slurry effluents and the composition, under agitation, during 20 to 40 minutes in a container; subjecting the mixture mass to a thermochemical transformation by melting the mass at a temperature of at least 1300° C., preferably between 1300 to 1670° C., most preferably between 1300 to 1580° C., to obtain a glassy substance; and cooling down the substance.

It is even another object of the present invention to carry out the incineration of the trash, with the exception of the hydrocarbons and industrial slurry effluents, before the first step of mixing, and mixing the ashes with said hydrocarbons and the industrial slurries.

It is another object of the present invention to provide a process wherein the mixture mass consists of hydrocarbons and said slurry effluents, with a composition containing 30% Sodium Sulphate, 7% Quartz, 20% Calcium carbonate, 23% Sodium Carbonate, 13% Organic Sulphate (consisting of 20% Sodium Sulphate and 80% Carbon Hydrates) and 7% Calcium Fluor, the composition comprising the 10–20 weight percentage of the mixture to form a mixture mass.

It is still another object of the present invention to provide a process wherein the mixture mass comprises ashes obtained from a preliminary incineration of the trash other than the hydrocarbons and said slurry effluents, the mixture mass comprises ashes including hydrocarbons and said slurry effluents and the mixture mass comprises trash, hydrocarbons and said slurry effluents, and toxic ashes; with a composition containing 30% Sodium Sulphate, 7% Quartz, 20% Calcium Carbonate, 23% Sodium Carbonate, 13% Organic Sulphate (consisting of 20% Sodium Sulphate and 80% Carbon Hydrates) and 7% Calcium Fluor to form a mixture mass, the composition comprising the 10–20 weight percentage of the mixture, wherein the toxic ashes are lb weight percentage of the mixture mass.

Briefly, it is another object of the invention to provide a glassy substance capable of being molded into solid stable pieces or converted into powder, and used in multiple applications like in construction, general industry, manufacturing of tiles, linings, ballast, etc.

The above and other objects, features and advantages of this invention will be better understood when reading the following description.

DESCRIPTION OF THE PREFERRED EMBODIMENTS

The process of the present invention comprises the thermochemical transformation of trash by means of the addition of appropriate elements forming a mixture mass and by melting at determined temperature ranges. By the melting, the chemical contaminants contained in the trash are stabilized and transformed to form part of a molecular structure of a vitreous or glassy substance, whereby the contaminating chemical elements of the trash are entirely neutralized.

The trash products that may be processed according to the invention include all kind of home garbage, industrial effluents, pathological trash, even dangerous highly contaminating residues, industry slurries, wasted hydrocarbons, wasted products from fuel service stations, paints, food, batteries, oils, pathological residues from hospitals, such as surgical gauzes containing blood, human being tissues, syringes, needles and general contaminating products.

In a preferred embodiment of the invention the trash other than that containing hydrocarbons and slurries are burned, in a preliminary incineration step, at temperatures between 800° to 900° C. in any kind of appropriate incinerators or furnaces. The wasted hydrocarbons, slurry effluents and liquid or oil residues from industries and/or gas service stations do not need to be entirely burned in such preliminary incineration but they are mixed with the ashes resulted from the preliminary incineration.

All the material to be transformed, that is the ashes and the hydrocarbons and slurries, are conveyed into a mixing station. Once the material has been fed into the mixing station a 10–20% of the following vitrifying composition is added: 30% Sodium Sulphate, 7% Quartz, 20% Calcium Carbonate, 23% Sodium Carbonate, 13% Organic Sulphate (consisting of 20% Sodium Sulphate and 80% Carbon Hydrates) and 7% Calcium Fluor to form a mixture mass, the composition comprising the 10–20 weight percentage of the mixture, thus forming a mixture comprising trash, hydrocarbons, slurries and the vitrifying composition.

15 w % of highly toxic residues such as arsenic ashes, ashes from batteries, ashes with chrome, may be added to the above mentioned mixture. The 15% amount has been taken into account to guarantee that the toxic elements remains trapped and entirely confined in the molecular structure of the final product.

With the purpose of obtaining a chemically stable vitreous product, the percentage of the vitrifying composition added to the mixture is proportional to the contaminating elements.

The mass is mixed until a mixture mass is obtained with an appropriate uniform consistency, to this purpose a rotating drum is employed, the mixing is carried out 20–40 minutes and under a humidity of 15% to prevent the chemical sublimation, and the mass is conveyed into an incinerator and thermochemically transformed by incineration to a temperature between 1300° to 1580° C. In the event the trash contains residues like syringes, needles, glass containers, the temperature may be increased up to 1670° C. With this treatment all the bacteria, virus, parasites and general undesired microorganisms with contaminant activity are chemically transformed and neutralized.

When the trash contains only hydrocarbons and slurries, the same are incinerated and the resulted ashes are mixed with the vitrifying composition, above described, to obtain a consistent mass and allow the mixture mass to vitrify. The composition is added in a proportion of 1 to 20% by weight of the mixture mass, preferably between 2 to 15% by weight of the mixture mass.

The vitrifying composition of the invention uses sodium sulfate which, in addition to the capacity of accelerating the process, modifies the superficial tension thus obtaining a quick removal of the gases, also helping in the molecular transformation of the non combustible oxides that, together with the silicates, form the new chemically stable vitreous structure at a temperature of 1450° C. The flux and agglutinating elements of the invention are the sodium sulfate that combined with the sodium carbonate, calcium carbonate, minimum proportion of quartz, sodium sulfate enclosed in an organic matrix and fluor produce fusion and liberation of gases so violent that an amalgamation and molecular transformation is produced.

The sodium sulfate enclosed in an organic matrix is prepared by mixing sodium sulfate (20%) with carbon hydrate (80%), under humidity of 25% until small spheres are formed. These spheres are dried and added to the vitrifying composition during the preparation of this composition.

The process for transforming the trash at high temperature may be carried out in a batch-type or continuous furnaces, in furnaces with recovering chamber, in furnaces with stationary vessels and adjustable vessels, in stationary single furnaces with side-discharge vessels or in furnaces with stationary vessel. All these furnaces can be operated with lower pressure gas or high pressure gas, or with liquid fuel.

In order that the process of the invention can comply with the proper temperature, time and transformation conditions, the process must be carried out under certain characteristics. It is known that an excellent vitrification depends on an excellent fusion and homogenization, which is achieved under certain movements of the vitreous mass in the furnace.

In a preferred embodiment of the invention the process is carried out in a furnace having a cascade bottom, i.e. the bottom of the furnace defines a plurality of steps.

In a first step of the process the raw material mixture comprising ashes, industrial slurries and the above described composition is introduced into a first stack of the furnace by means of a pneumatic or mechanical feeder. The feeding of the raw material is carried out according to a proper time and volume sequence depending on the composition of said raw material. This mass enters the furnace stack as a floating mass and it incorporates to the melt mass until a certain homogeneity is achieved. This homogeneity is obtained by controlling the time and temperature. As the volume of the material mass residing in the first stack increases part of the vitreous mass overflows into the second stack that is located at a lower level relative to the first stack. The stacks are connected to each other by overflow systems that allows the mass passing from one stack to the lower one to liberate or free gases from the vitreous mask thus improving the homogenization and refining of the mass. With the melting mass passing from the first stack to the lower second stack the mass residing in the second stack is caused to overflow to the lower next stack in the cascade pattern. This pattern is repeated until the melting mass is transferred to an exit of the furnace. At this exit the fluidity of the vitreous mass is maintained by means of a burner that keeps the mass at a desired temperature that allows the mass to fluidly fall and pour into a collecting container. In the third stack the transformation of the material is completed and a stable vitreous substance is obtained.

The lowest temperature at the furnace is between 1400–1450° C. for a 5 tn. furnace the temperature in the first stack may be 1450° C., the temperature at the second stack may be 1440° C. and the temperature at the third stack may be 1400° C.

The mixture mass is transformed within the furnace into a vitreous substance having a consistency very similar to the honey. Depending of the kind of application for the substance, this honey-like mass is removed from the furnace and solidified by means of different cooling steps. For example, the flowing mass may be poured into water so as to generate a thermal shock by means of which the mass is abruptly solidified into pieces, like "fried" pieces, which pieces may be used as ballast or further processed to obtain powder for the industry. Alternatively, the flowing substance may be cooled down by contacting the same with oil, either by placing the substance into molds or directly into the oil, to obtain very compact solid glassy pieces. Another method to manufacture solid molded pieces comprises pouring the substance into molds with a desired shape and let the molds, with the substance therein, cool down at room temperature.

The substance and products obtained by the process of the invention have been found to be entirely inert without contamination activity. For testing these products, a trash containing ashes from a preliminary incineration, industrial slurries, wasted industrial oils, batteries, slurries from gas service stations, wasted aluminum oxide, and other contaminants, was mixed and fed into an incinerating furnace. The trash was mixed and incinerated to 1,500° C. and a vitreous substance was obtained, which substance was solidified by cooling down the same in water, in oil and by air-cooling.

The solid products were converted into powders and subject to a leaching test according to rule EPA S846-1990. The results in all the samples were as follows:

| | |
|---|---|
| Lead (ppm) | 0.00 |
| Cadmium (ppm) | 0.00 |
| Zinc (ppm) | 0.00 |
| Mercury (ppm) | 0.00 |
| Copper (ppm) | 0.00 |

Concluding, the results form the leaching test show that the samples do not have any contaminants, therefore, the process of the invention does not consist, like the processes of the prior art, in the mere encapsulating of compacted trash but in the chemical transformation of the trash so that the trash perse is neutralized and converted into an inert product, without contamination activity. The product obtained from the invented method may be also used in the production of vitrifiable paints, glass wool for isolation use or components used as fillers.

The invention will now be further clarified by a consideration of the following purely exemplary and non-limiting examples.

EXAMPLE 1

The organic sulphate is prepared by mixing Sodium Sulphate 42 kg. with Carbon Hydrate 2.08 Kg. having a 25% of humidity and under rotating movement to form small spheres. Then the spheres have been dried and added to the vitrifying composition.

20 Kg. of the vitrifying composition have been prepared containing 30% Sodium Sulphate, 7% Quartz, 20% Calcium Carbonate, 23% Sodium Carbonate, 13% Organic Sulphate (consisting of 20% Sodium Sulphate and 80% Carbon Hydrates) and 7% Fluor of Calcium.

The following components have been mixed in a rotating drum with a 15% humidity during 20 minutes:

| | |
|---|---|
| Ashes from pathogenic residues | 45 Kg. |
| Ashes from industrial residues | 45 Kg. |
| Ashes from industrial slurries | 45 Kg. |
| Washed industrial slurries | 45 Kg. |
| Vitrifying composition | 20 Kg. |

Once the components have been properly mixed the same have been stored into a close container to be then fed to the furnace hopper. An automatic feeder system has been used to feeding the material to the furnace. The mixture has been fed into the first furnace stack wherein the melting process begins and is maintained for 20 minutes. Additional mixture material is added to the first stack and the vitreous fluid mass passes by overflowing to the second lower stack and then to the third stack. In a furnace having a 5 tons capacity the final obtained product was 210 Kg/hour, that is, 70 Kg. of the vitreous mass pass each 20 minutes from stack to stack. Obviously, the material quantity and time intervals for feeding the material into the furnace depends from the contaminant components contained in the mixture.

EXAMPLE 2

This example is useful to illustrate the best mode of carrying out the process of the invention when, in addition, highly toxic substances of ashes from arsenic, batteries, chrome and lead. The process is carried out mostly as described in Example 1 but the mixing to be melt is made as follows:

In a rotating drum, with 15% of humidity during 40 minutes, the following elements are mixed:

| | |
|---|---|
| Ashes from pathogenic residues | 37.5 Kg. |
| Ashes from industrial residues | 37.5 Kg. |
| Ashes from industrial slurries | 37.5 Kg. |
| Washed industrial slurries | 37.5 Kg. |
| Vitrifying composition | 20.0 Kg. |
| Ashes with chrome | 30.0 Kg. |

As it is clear from the above examples one of the particulars of the present invention is that the process does not use Calcium Sulphate which, as explained above, would cause undesired bubbles and stone granules. The invented process uses Sodium Sulphate that is remarkably used in a proportion that, in addition, is lower as compared to the quantity that would be necessary for the conventional Calcium Sulphate.

As stated above, the sodium sulfate, in addition to the capacity of accelerating the process, destroys the superficial tension thus obtaining a quick removal of the gases, also helping in the molecular transformation of the non combustible oxides that, together with the silicates, form the new chemically stable vitreous structure at a temperature of 1450° C.

While preferred embodiments of the present invention have been illustrated and described, it will be obvious to those skilled in the art that various changes and modifications may be made therein without departing from the scope of the invention as defined in the appended claims.

We claim:

1. A process of producing a glassy product for multiple applications, by recycling trash containing one or more of the following, wasted elements, dangerous residues, pathological wastes, home garbage, wasted hydrocarbons and industrial slurry effluents, the process comprising the steps of:
   mixing the trash,
   forming a mixture mass by adding a vitrifying composition comprising 30% Sodium Sulphate, 7% Quartz, 20% Calcium Carbonate, 23% Sodium Carbonate, 13% Organic Sulphate (consisting of 20% Sodium Sulphate and 80% Carbon Hydrates) and 7% Calcium Fluor, the composition comprising the 10–20 weight percentage of the mixture,
   agitating and mixing the mixture mass formed of the trash, the industrial slurry effluents and the vitrifying composition during 20 to 40 minutes in a container,
   melting the mixture mass at a temperature of at least 1300° C. whereby a thermochemical transformation is caused to obtain a glassy substance, and
   cooling down the substance.

2. The process of claim 1, wherein the glassy substance is solidified after the cooling down step.

3. The processing of claim 1, wherein the cooling step are selected from leaving the glassy substance solidify under air-cooling, placing the glassy substance in contact with water to obtain a fried solid product by thermal shock, and placing the glassy substance in contact with oil to get a compact solid glassy product.

4. The process of claim 1, wherein the cooling step is carried out by pouring the glassy substance into molds and letting the substance solidify under air-cooling.

5. The process of claim 1, wherein the thermochemical transformation is carried out at a temperature between 1300 to 1670° C.

6. The process of claim 1, wherein the thermochemical transformation is carried out at a temperature between 1300 to 1580° C.

7. The process of claim 1, wherein the trash other than said hydrocarbons and said slurry effluents are preliminary incinerated before the first mixing step to convert the same into ashes, these ashes being then mixed with the hydrocarbons and slurry effluents.

8. The process of claim 7, wherein the preliminary incineration is carried out at a temperature between 800 to 900° C.

9. The process of claim 1, wherein the trash contains industrial slurry effluents.

10. The process of claim 1, wherein the trash of the mixture mass consists of hydrocarbons and slurry effluents and this trash is mixed with the vitrifying composition.

11. The process of claim 1, wherein the mixing step further comprising:
   adding 1 to 20 wt. % silicates.

12. The process of claim 1, wherein the trash comprises ashes obtained from a preliminary incineration of the trash consisting of components other than hydrocarbons and slurry effluents.

13. The process of claim 1, wherein the trash comprises ashes including hydrocarbons and slurry effluents.

14. The process of claim 1, wherein the trash comprises hydrocarbons, slurry effluents and toxic ashes.

15. The process of claim 14, wherein the toxic ashes are selected from de group consisting of ashes with arsenic, ashes from incinerated batteries, ashes with lead y ashes with chrome.

16. The process of claim 14, wherein the toxic ashes are no more than 15 wt. % of the mixture mass.

17. A material useful for multiple applications in building construction, in tiles, lining, ballast, paving, the material being obtained by recycling trash containing one or more of the following, wasted elements, dangerous residues, pathological wastes, home garbage, wasted hydrocarbons and industrial slurry effluents according to the process of claim 1, wherein the material is a non-contaminating glassy solid.

18. A molded product useful for multiple applications in building construction, tiles, lining, ballast, paving, the product being obtained by recycling trash containing one or more of the following, wasted elements, dangerous residues, pathological wastes, home garbage, wasted hydrocarbons and industrial slurry effluents, according to the process of claim 4, wherein the product is a non contaminating glassy solid piece.

* * * * *

UNITED STATES PATENT AND TRADEMARK OFFICE
CERTIFICATE OF CORRECTION

PATENT NO. : 6,223,560 B1  Page 1 of 1
DATED : May 1, 2001
INVENTOR(S) : Robert Girotti et al.

It is certified that error appears in the above-identified patent and that said Letters Patent is hereby corrected as shown below:

Column 2,
Line 51, "is further" and insert -- is a further --.

Column 3,
Line 24, delete "1b" and insert -- 15 --.

Column 5,
Line 66, delete "EPA S846-1990" and insert -- EPA S846-1980 --.

Column 8,
Line 38, delete "de" and insert -- the --.
Line 39, delete "y" and insert -- and --.

Signed and Sealed this

Fourth Day of December, 2001

Attest:

NICHOLAS P. GODICI
*Attesting Officer*   *Acting Director of the United States Patent and Trademark Office*